J. PARRY.
Swinging Mirror.
No. 221,858.  Patented Nov. 18, 1879.
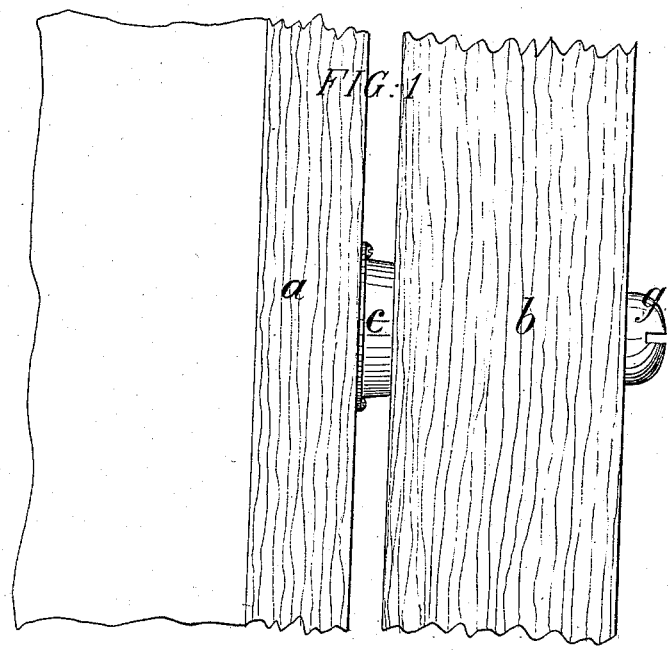
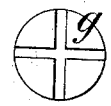
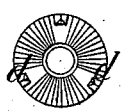
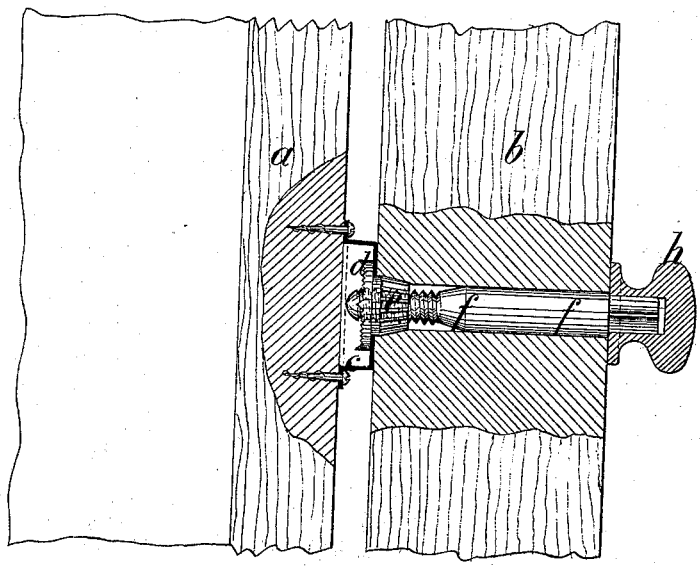
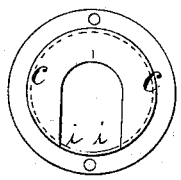
Witnesses
Alexander Patterson
Harry Smith
Inventor
John Parry
by his Attorneys
Howson and Son

UNITED STATES PATENT OFFICE.

JOHN PARRY, OF SALE, COUNTY OF CHESTER, GREAT BRITAIN.

IMPROVEMENT IN SWINGING MIRRORS.

Specification forming part of Letters Patent No. 221,858, dated November 18, 1879; application filed July 9, 1879.

*To all whom it may concern:*

Be it known that I, JOHN PARRY, of Sale, in the county of Chester, Kingdom of Great Britain and Ireland, have invented Improvements in Swinging Mirrors, of which the following is a specification.

This invention relates to the construction of the fittings or movements which are applied to swing looking-glasses for the purpose of retaining them in any position or at any required angle, the object of the present invention being to render such fittings more efficient, and to facilitate and cheapen the manufacture of the same.

In the annexed drawings, which form part of this specification, Figure 1 is a front elevation, and Fig. 2 a vertical section, of part of the frame and pillar or bracket of a looking-glass with my invention shown as applied thereto, $a\ a$ being the frame, and $b\ b$ the pillar or bracket.

To about the center of the frame $a\ a$ of the looking-glass, on each side, I affix, by screws or otherwise, a metal plate or socket, $c\ c$, the back of which is recessed. In the recess fits the head $d\ d$ of a short bush or nut, $e\ e$, the body of the said bush passing through a hole in the center of the plate or socket $c\ c$, so that the plate or socket attached to the frame $a\ a$ of the looking-glass can revolve around the head $d\ d$ of the bush $e\ e$. The part of the bush which projects outside the plate or socket may be squared or flattened, or have projections or pins on its surface, or it may be roughened in such a manner as to prevent it revolving or turning round when fitted in or up to part of the inner side of the pillar or bracket.

The bush $e\ e$ is drilled with a hole through the center and screwed, and a screw, $f\ f$, passed inward through the pillar or bracket $b\ b$, screws into the said bush. This screw $f\ f$ may be provided with a head, $g\ g$, having notches or splits therein, (see Fig. 3,) by means of which it can be screwed up, when required, by a screw-driver or other similar instrument, (or even by means of a coin;) or it may have attached to it a knob or rosette of wood, $h\ h$, (see Fig. 2,) or other material, part of the shank of the screw being squared or flattened, so that it cannot turn in the knob.

In cases where it is required or considered desirable to remove the looking-glass from the stand and replace it without removing the screws, I make a notch, $i\ i$, through the under side of the recessed plate or socket $c\ c$, large enough for the head $e\ e$ of the bush $d\ d$ to pass through, (see Fig. 4,) so that the frame can be lifted out and replaced without removing the screws $f\ f$.

It will be evident that the joint may be tightened or loosened by screwing up or slackening the screws $f\ f$ by means of the notched heads, or by the knobs or rosettes $h\ h$ on their ends.

The back of the head $d$ may be formed with teeth, or otherwise roughened, (see Fig. 5,) so that when the screw $f$ is being screwed into the bush $e$ the roughened back of the head $d$ will bear against the edge of the frame and prevent the bush from turning until the roughened face of the bush is brought into contact with the pillar.

I claim as my invention—

The combination of the recessed plate $c$ and roughened bush or nut having a head arranged to fit in said plate with a screw, $f$, adapted to said nut, and provided at its opposite end with a notched head or rosette, all substantially as described.

In testimony whereof I have signed my name to this specification in presence of two subscribing witnesses.

JOHN PARRY.

Witnesses:
JNO. HUGHES,
FERD. BOSSHARDT.